Patented July 17, 1928.

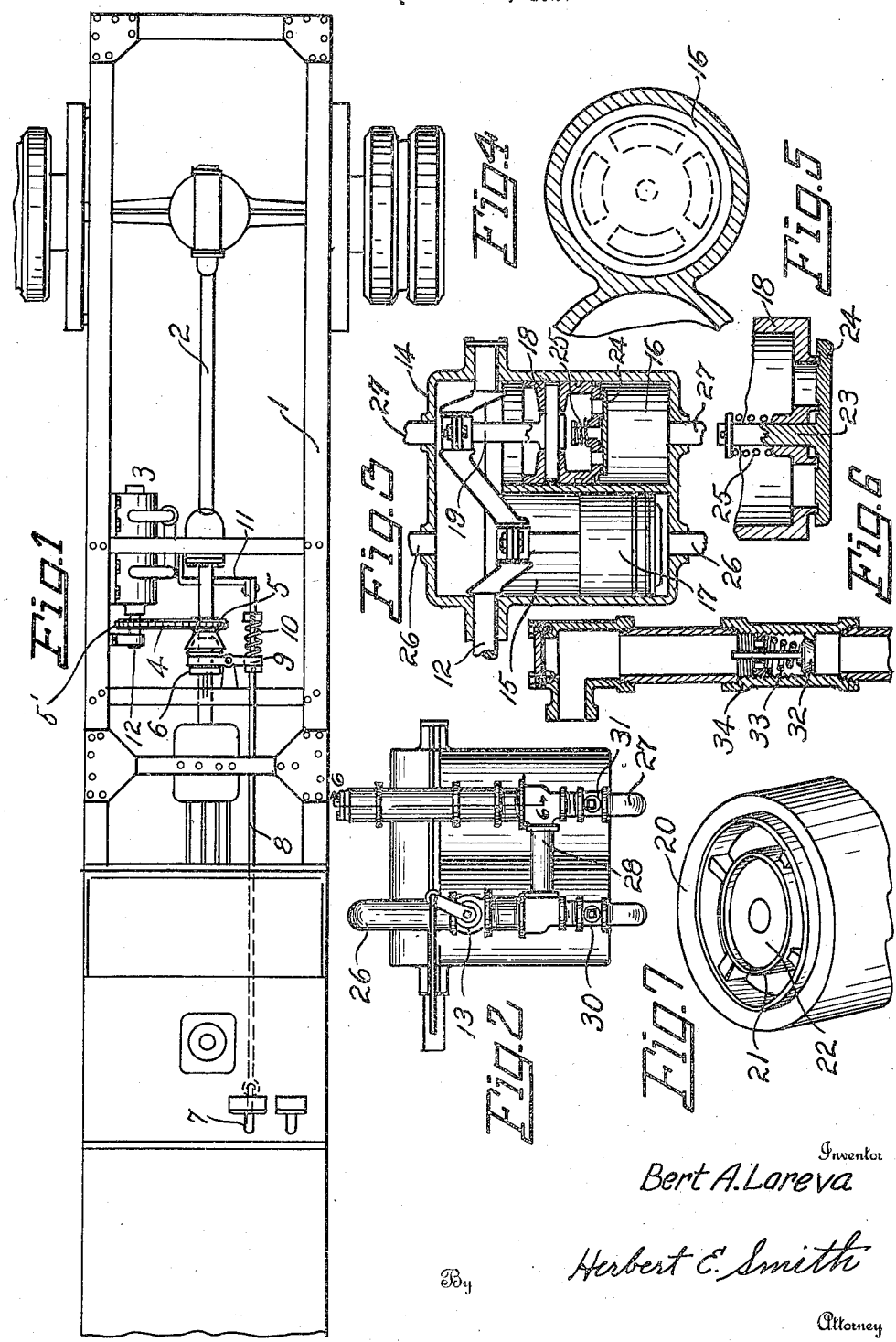

1,677,481

UNITED STATES PATENT OFFICE.

BERT A. LAREVA, OF SPOKANE, WASHINGTON.

VEHICLE BRAKE.

Application filed March 23, 1927. Serial No. 177,568.

My present invention relates to improvements in vehicle brakes of the fluid pressure type of internal resistance, employing reciprocating pistons in communicating cylinders or chambers. The fluid pressure brakes while applicable for use with automotive vehicles of various types, are especially adapted for use with automotive trucks and other heavy duty vehicles where a positive braking system is required with low operating expense.

The braking system includes a pumping mechanism comprising a crank shaft that is connected, as by sprocket chain or other gearing with the propeller shaft of the vehicle, and a clutch mechanism is provided on the propeller shaft whereby the normally idle pumping mechanism is coupled with and driven from the propeller shaft to supply the internal resistance of fluid pressure to retard or prevent the operation of the propeller shaft. In connection with the operating device of the clutch mechanism means are provided for controlling and operating a control valve for the fluid pressure brake, as will hereinafter be more specifically pointed out and claimed.

In the accompanying drawings I have illustrated one complete example of the physical embodiment of my invention wherein the parts are shown and combined and arranged according to the best mode I have thus far devised for the practical application of the principles of my invention.

Figure 1 is a plan view of the parts of an automotive vehicle that are necessary to illustrate the general assembly and arrangement of parts of my invention.

Figure 2 is a view of an elevation of the fluid brake device showing the control valve and pipes of the fluid circulation system connected with two cylinders or chambers.

Figure 3 is a detail sectional view of the pump or brake chambers, showing the pistons, one of which is in section, the crank shaft, etc.

Figure 4 is a bottom plan view of a piston valve-head in its cylinder.

Figure 5 is an enlarged detail sectional view of the valve-head of one of the pistons.

Figure 6 is a detail sectional view of one of the pipes showing the pressure regulating valve to secure resiliency in the circulation system and relieve undue strains in the application of braking power, as at line 6—6 Fig. 2.

Figure 7 is a perspective view, at the end of a piston showing the seat for the valve-head.

In order that the general assembly and arrangement of parts may readily be understood I have indicated in Figure 1 chassis 1 of an automotive truck and the usual longitudinally disposed propeller shaft 2. The braking device which is indicated as a whole by the numeral 3 is located at one side of the propeller shaft and of course supported from the chassis. Suitable gearing, as a sprocket chain 4 and sprocket wheel 5 are employed to drive the sprocket wheel 5' on the crank shaft 12, from the propeller shaft 2, and in connection with this drive gearing for the braking mechanism I employ a clutch device 6 of the friction type on the propeller shaft. The clutch is controlled and operated from the pedal or lever 7 which is located in position readily accessible for the driver of the truck, and the connecting rod 8 extends rearwardly to the clutch yoke 9. A spring 10 is utilized to hold the clutch operating mechanism in open position and to return the clutch to that position after an application of the brakes. An operating lever 11 for the brake 3 is connected to the control valve 13 and this lever is operated simultaneously with the clutch yoke 9 thereby positioning the parts to transmit power from the propeller shaft to the crank shaft and arranging for the internal fluid pressure or internal resistance of the brakes to retard or stop the propeller shaft.

The crank shaft is journaled in bearings in the crank case 14 and the latter is fashioned with a pair of cylinders or chambers 15 and 16 in which the hollow pistons 17 and 18 reciprocate idly when the control valve 13 is open, but which form compressors for the oil or other fluid in the cylinders when the control valve is partially or wholly closed to prevent circulation of the oil in the braking system. The pistons are connected as usual to the crank shaft by rods 19 and each piston is fashioned with open ends so that the oil, in circulation, may pass through the pistons in one direction on the idle stroke of the compressor piston.

At one end each open-end piston is provided with a pair of concentric rings or seats 20 and 21 and a central hub or bearing 22, the latter for the slidable stem 23 of the grooved valve-head 24 which is held normally on the seats or rings 20 and 21 by the spring 25. On the down or working stroke of the piston the valve head is closed on its seats and the fluid is compressed to perform the functions of a brake, while on the up or idle stroke of the piston the spring retained valve-head is opened by fluid pressure to permit passage of the fluid.

The circulation system for the fluid in connection with the chambers or cylinders includes pipes 26 and 27 and cross pipe 28. The pipes 26 and 27 enter the crank case 14 at the top of the brake device above the pistons and they are connected at the lower ends of the cylinders 15 and 16 below the pistons. The control valve 13 is located in the pipe 26 and the cross pipe 28 connects the two pipes 26 and 27 so that the fluid pressure may be equalized in the chambers or cylinders and throughout the pipes 26 and 27. Check valves 30 and 31 which open away from the pressure side of the pistons are located in the pipes to insure one-way circulation of the oil, and a regulating valve 32 which is opened against the tension of spring 33, and which opens in the opposite direction to that of the check valves, is located in the casing 34 of the pipe 27. As previously stated, when valve 13 is open the oil is free to circulate, but when the valve is partially closed, its circulation is retarded, and a complete closure of the valve and stoppage of circulation, applies the brake to stop revolution of the propeller shaft.

Having thus fully described my invention, what I claim as new and desire to secure by Letters Patent is—

1. In a fluid braking system the combination with its crank shaft having a sprocket wheel, of a vehicle propeller shaft having a friction clutch, a sprocket wheel and a chain connecting said wheels, a pedal actuated control lever and valve for the fluid braking system, operating means for the clutch and means for normally holding the clutch open, and means connecting the clutch operating means with the control lever.

2. In a fluid braking system the combination with a pair of cylinders, a crank shaft and pistons connected to the shaft and having open ends, of spring pressed valve-heads to close said pistons on their working strokes, a circulation pipe connected at the opposite ends of each cylinder and check valves in said pipes, a control valve in one of said pipes, and a pressure regulating valve in the other of said pipes, and a cross pipe connecting said circulation pipes.

In testimony whereof I affix my signature.

BERT A. LAREVA.